United States Patent Office 3,655,847
Patented Apr. 11, 1972

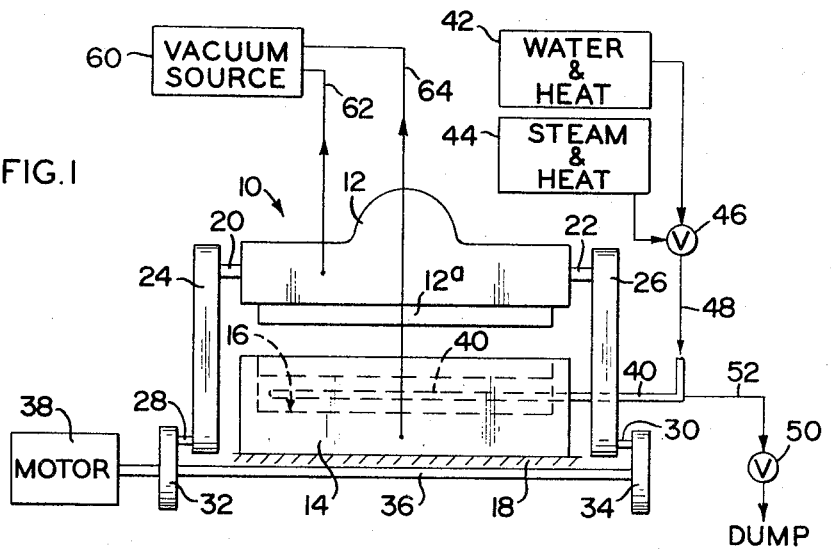
FIG. 1
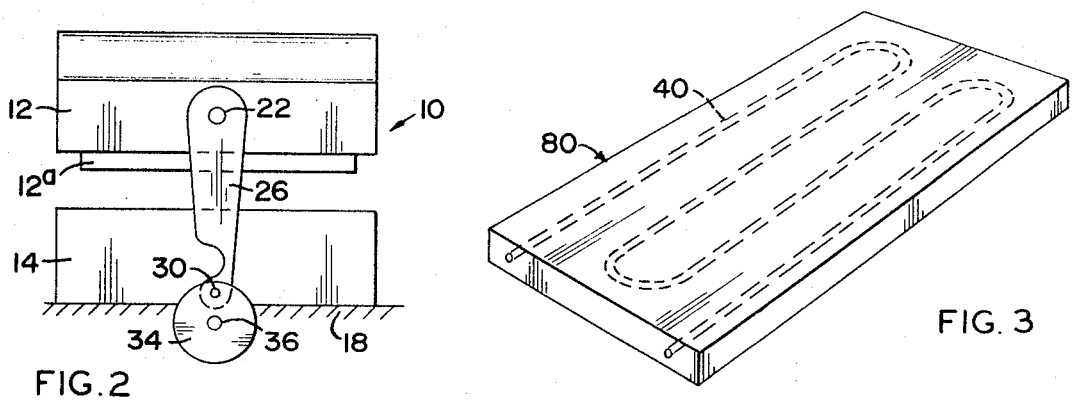
FIG. 2
FIG. 3
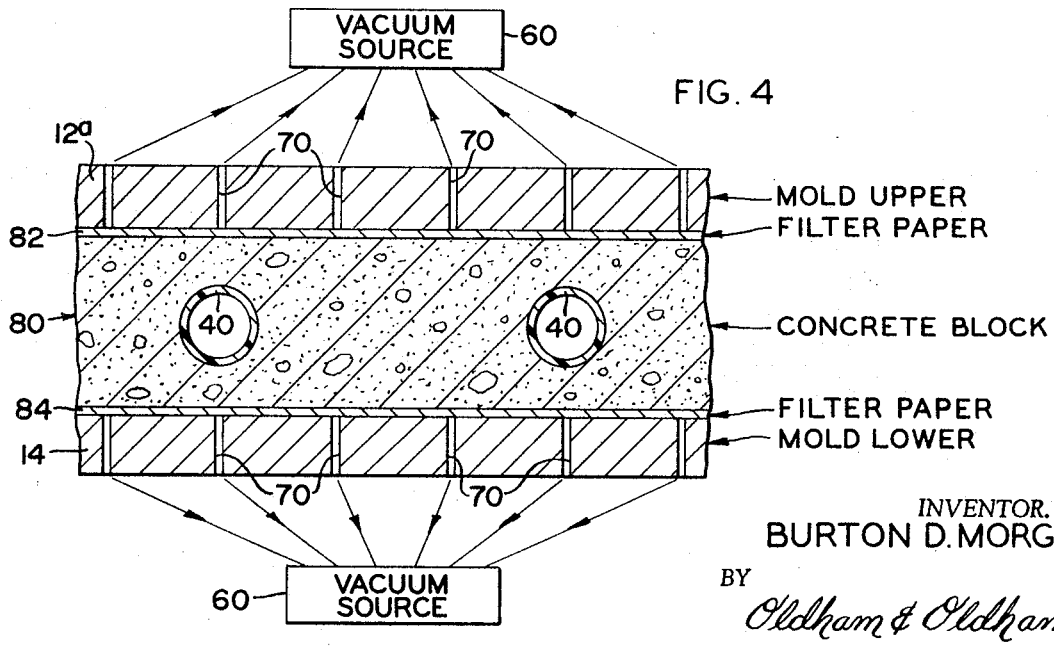
FIG. 4

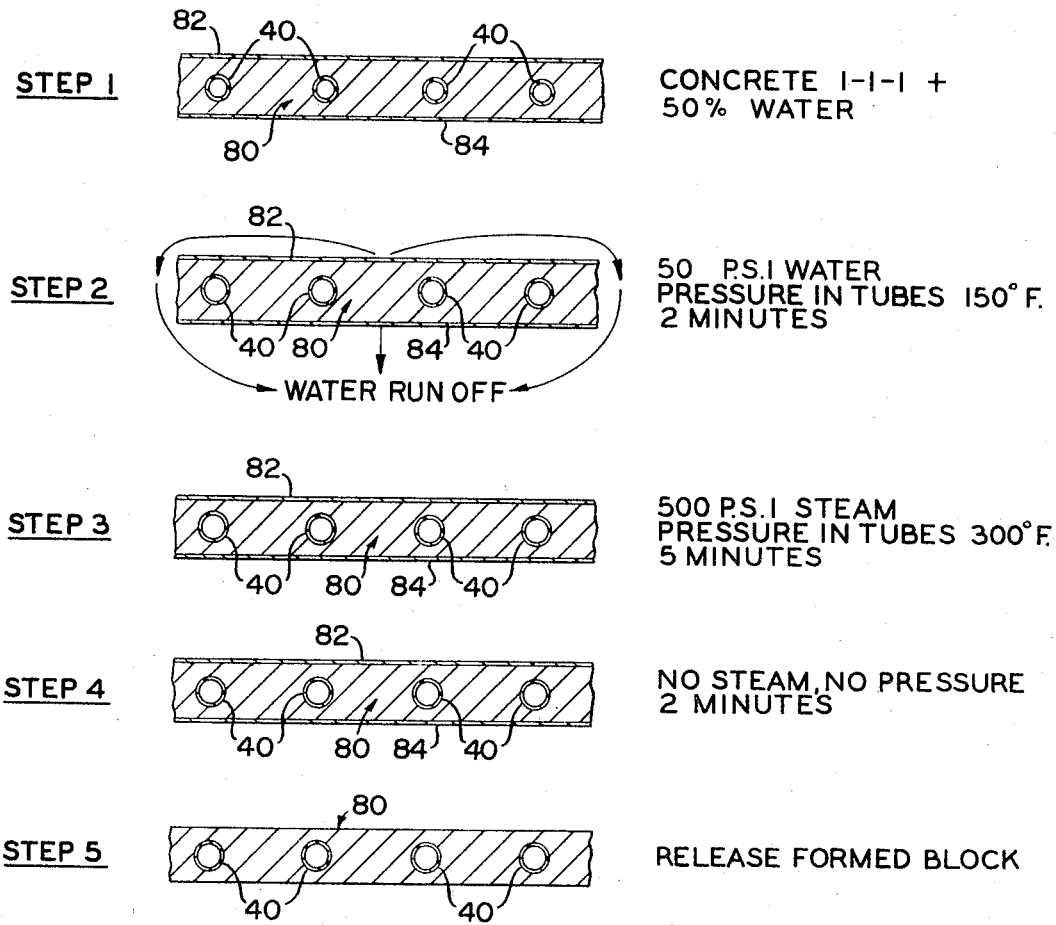
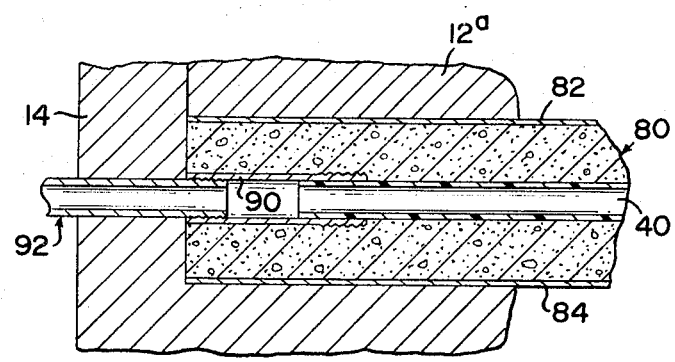

3,655,847
METHOD FOR FORMING CONCRETE PANELS UNDER COMPRESSION
Burton D. Morgan, 302 Aurora St.,
Hudson, Ohio 44236
Filed Feb. 19, 1969, Ser. No. 800,418
Int. Cl. B29b 7/32, 23/00
U.S. Cl. 264—94
2 Claims

ABSTRACT OF THE DISCLOSURE

The invention relates to a method particularly adapted for forming concrete panels under pressure which essentially comprises positioning an expandable tube within the concrete to be formed and heating and pressurizing the tube into expansion while retaining or maintaining a uniform cavity size during the forming operation whereby internal pressure is thus exerted onto the formed concrete by the pressurization of the expandable tube to increase density and structural strength while lowering curing time of the concrete panels so formed.

Heretofore, it has been known that concrete has been formed for prestressing and structural building uses in many and various ways. Further, recently it has been recognized that forming of concrete under compression during the forming enhances the properties of the concrete by making it more dense with greater strength while also reducing the curing time. However, the present methods to form compressed concrete are extremely expensive, and require complex, cumbersome, and very large mold machinery to achieve the forming operation.

The general object of the invention is to provide an extremely simple, yet high efficient method to form compressed concrete into building panels, or other structural configurations.

A further object of the invention is to provide for forming compressed concrete by utilizing internal pressure in addition to heat to reduce curing times by providing heat and pressure inside an expandable plastic tube positioned internally of the concrete when poured and in a substantially fluid state.

The aforesaid objects of the invention and other objects which will become apparent as the description proceeds are achieved by providing a method for forming concrete panels which comprises the steps of pouring a fluid concrete mixture to fill a mold cavity, positioning at least one elongated inflatable and expandable membrane within the mixture inside the cavity where he interior of the membrane is in communication through the cavity housing, closing the cavity, passing fluid heated to less than the boiling point of water at between 25 p.s.i. to 75 p.s.i. through the membrane for one to three minutes, passing a fluid heated to well beyond the boiling point of water at between 400 p.s.i. to 600 p.s.i. through the membrane for between four to six minutes and releasing the pressure and heat and removing the concrete from the cavity.

For better understanding of the invention reference should be had to the accompanying drawings wherein:

FIG. 1 is a front elevation in schematic form showing a press which might be utilized to achieve the steps comprising the preferred embodiment of the invention;

FIG. 2 is a side elevation of the press of FIG. 1;

FIG. 3 is a perspective view of the compressed sheet of concrete formed as a wall panel by the preferred method of the invention;

FIG. 4 is a greatly enlarged cross-sectional illustration of the sheet of FIG. 3 positioned in the mold cavity of FIGS. 1 and 2;

FIG. 5 is a four-step flow diagram illustrating the steps taken during the process of the invention; and FIG. 6 is a fragmentary sectional view showing one arrangement for connecting the expandable tube to the fluid source.

With reference to FIGS. 1 and 2 of the drawings, these figures illustrate the type of mold press which might be utilized to achieve the method of the invention. Specifically, a press indicated generally by numeral 10 comprises an upper housing 12 and a lower housing 14. The housing 14 is actually the female member, and contains a mold cavity 16 indicated in dotted lines. The housing 14 is in this instance fixed to any suitable support frame 18, and upper housing 12 carries a male cavity closing protrusion 12a.

This particular press construction is a mechanically closing press, and it essentially comprises mounting the upper housing 12 in journaled relation by pins 20 and 22 to a pair of vertically movable arms 24 and 26, respectively. The vertical movement of arms 24 and 26 may be accomplished in several ways. A simple schematic illustration is shown which comprises connecting them rotatably through shafts 28 and 30 to cam wheels 32 and 34 respectively. The cam wheel 32 and 34 are mounted in fixed relationship to each other by a common shaft 36 which shaft 36 is driven by suitable motor 38. Hence, with reference to FIG. 2 of the drawings, it is seen that with the upper housing 12 indicated in the open position, the connecting rod 30 is in the vertical upward position with respect to its wheel 34. A 180° rotation of wheel 34 moves rod 30 to the vertical downward position and closes the upper housing 12. Naturally, in the upper position, as indicated in FIG. 2, the housing 12 can be tilted to facilitate pouring or placing a partially formed concrete panel into the female cavity 16 in housing 14.

This type of mechanically closing press is well known in the art, and has been utilized in the past for many different purposes. However, the essential purpose of this type of press is to simply achieve a secure and positive closing of the press, and to maintain a constant cavity volume when pressure is introduced to the interior of the mold cavity. Naturally, however, a suitable hydraulic actuated press, or the like, might also achieve the objects of the invention. However, the mechanical closing press appears at this point to be the most economical, and satisfactory to perform the method of the invention.

In order to achieve the method of pressurizing the concrete formed with the cavity 16 of female housing 14, the invention contemplates positioning a hollow plastic tube 40 within the cavity and substantially about the middle of the concrete poured thereinto. The position of such tube would preferably be laced back and forth uniformly, as is illustrated in FIG. 3 of the drawings. In any event, the tube 40 is connected to water and heat from source 42 or steam and heat from source 44 to provide a continuous circulation of water and heat as appropriately controlled through a valve 46, and supplied through a line 48 to the tube 40. Pressure and fluid dump can also be accomplished by appropriately controlling a valve 50 positioned in line 52.

As will be more fully defined hereinafter, a vacuum source 60 is provided for connection to the appropriate housings 12 and 14 through lines 62 and 64 respectively to draw moisture and fluid, which is usually water off the cavity 16 as the concrete is compresesed during the forming operation.

FIG. 4 illustrates the mold cavity with the concrete panel positioned to perform the method steps of the invention. Note that both the upper housing 12 and lower housing 14 are perforated with holes indicated generally by numeral 70 showing a schematic connection therefrom to the vacuum source 60. The concrete panel is indicated generally by numeral 80, and it is positioned between thick and porous pieces of filter paper 84 which lie adjacent the top housing 12 and bottom housing 14, respectively. The filter papers 82 and 84 are porous to water, or other fluid which might be compressed out of the concrete 80, but yet have sufficient strength so as not to allow rupture into the holes 70, and to mar the upper surface of the concrete as it is compressed by expansion of tube 40, as will be more fully defined hereinafter. Essentially, the invention contemplates that the filter paper will be between about 2 to about 10 millimeters in thickness, and readily pass water therethrough in a blotting capillary action.

The tube 40 is preferably a suitable type of polyethylene or polyvinyl which has properties to expand without rupture to substantially at least twice its size. However, it does not have to be capable of withstanding by itself the type of pressures that will be exerted into the interior thereof, because its outside will be supported by the concrete material itself. In the preferred method of the invention, while forming building construction panels, which for example are 50 inches wide and 100 inches long and 4 inches thick, the tube 40 will take about a 1½ inch diameter, and be capable of expanding out to about a 3 inch diameter during the process steps as defined hereinbelow.

The cycle of the invention is most clearly illustrated with respect to FIG. 5 of the drawings which shows in step 1 that the concrete 80 is positioned with the tube 40 about centrally located therein, and the filter paper 82 and 84 on either side thereof. Any suitable way to support or position the polytubes 40 in position will meet the objects of the invention. One convenient way might be to pour half a panel thickness, then lay the tubes in flat condition, and then pour the remainder of the panel to positively position the tube about centrally thereof, as is indicated in step 1 of the FIG. 5. This type of procedure has long been used for positioning metal reinforcing members within prestressed concrete or the like. For the purposes of a building panel construction, a concrete mixture of one part cement, one part sand, and one part stones, plus 50% water might be the preferable mixture.

With the tube 40 appropriately connected through the piping system shown in FIG. 1, and with such connection being accomplished as shown in FIG. 6 by incorporating a metal insert pipe 90 which connects to the tube 40, and which itself may be threadably connected to a connecting pipe, indicated generally by numeral 92 might be one suitable way to connect the interior of tube 40 in communication through the wall of the lower housing 14 with an exterior piping system indicated by pipe 92. Any suitable structure to achieve a communication through the mold 14 and into cavity 16 so as to communicate in fluid tight relationship with tube 40 will achieve the objects of the invention.

Step 2 then involves circulating water at about 50 p.s.i. pressure in the tube at about 150° F. for two minutes. Expanding these figures, one might fall within a range of between 25 to 75 p.s.i. water pressure, 100° to 200° F., and between one and three minutes of this step.

Step 3 then involves an increase in pressure as well as an increase in temperature. For example, the preferable operating mode of this step of the method would pass 500 p.s.i. steam pressure in the tube 40 at about 300° F. for five minutes. The ranges on this step might be between 400 to 600 p.s.i. steam pressure at between 200° to 400° F. and between about three to eight minutes. While step 2 allows expansion of the plastic tubes to squeeze water from the cement and allow the water to be drawn through the perforated steel molds by the vacuum source 60, step 3 tends to melt the tube pressing it into the concrete which achieves further compression while also providing heat transfer which greatly enhances the cure rate of the concrete.

Step 4 involves a slow relaxing of pressure and temperature over about a one minute period to return the concrete to a natural state, but allowing curing to continue because of the increased pressure and retained temperature relationships in the concrete itself. Actually, this slow release of steam and pressure could be accomplished over a span of between about five seconds to about two minutes.

Step 5 then involves simply removing the panel, and passing it somewhere for final cure operation since it has fully solidified, although it has not finally cured in the five to fifteen minute cure cycle set forth above. However, because of the compression in the molding technique achieved by the expansion of the tube 40, a denser, faster curing concrete panel is formed, and one which has greater structural strength because of the greater density.

Naturally, the mold surfaces could be formed to various shapes so as to give an artistic design to the out surface of the concrete panels so formed. Similarly, the edge configurations can be formed to conventional cement block cross sections, for example, so that ready joining between panels can be accomplished to give the structural requirements of the panels in joined configuration necessary for compression loading in a structural environment. These type of pinned molds, and the holding of edges rigid during pressure cycles are well known in the mold art, and do not comprise a part of the method of the invention.

Any quick release attachment of the vinyl tubes to the metal pipes 90 inserted as a part of each concrete pouring can be utilized, so long as the ability to pass fluid under pressure is achieved. In fact, it is contemplated that the metal pipe 90 will be permanently attached to tube 40 before the insertion thereof is ever made into the molds, and that such ends will be screwed into the pipes 92 projecting through the housing 14 before the final pour of concrete into the mold takes place.

While tubes have been defined as the medium to expand and provide pressure and heat transfer, any inflatable and expandable membrane that would allow transfer of heat and pressure substantially uniformly throughout the panel would meet the objects of the invention.

Thus, it is seen that the objects of the invention have been achieved by incorporating an expandable tube or diaphragm inside a concrete panel whereby the pressurization of such tube causes compression forming of the panel to achieve greater densities in the concrete panel, together with faster cure times. The simple addition of heat to the interior of such tubes is accomplished by utilizing steam as the pressure source, although any other convenient fluid medium might be utilized.

While in accordance with the patent statutes, only the best known embodiment of the invention has been illustrated and described in detail, it is to be particularly understood that the invention is not limited thereto or thereby, but that the inventing scope is defined in the appended claims.

What is claimed is:

1. A method for forming concrete panels which comprises the steps of
    (a) positioning at least one elongated expansible fluid-tight tube of synthetic plastic material within a mold cavity in a non-linear form and with the ends of the tube extending to the sides of the mold cavity.
    (b) pouring a fluid concrete mixture into the mold cavity to fill the cavity and surround the tube,
    (c) closing the mold cavity and maintaining a uniform volume therein during the succeeding steps (d) through (f),
    (d) passing a fluid to about 150° F. at between 25 p.s.i. to 75 p.s.i. through the tube for between one to three minutes to expand the tube,
    (e) subsequently passing a fluid heated to between 250° F. to 350° F. at between 400 p.s.i. to 600 p.s.i. through the tube for between 4 to 6 minutes whereby the tube tends to melt and is pressed into the concrete.

(f) releasing the heat and pressure, and (g) opening the mold cavity and removing the concrete panel from the cavity, the inflatable tube being embedded in the concrete of the panel.

2. The method according to claim 1 wherein the tube is expanded to between 10% to 40% of the volume of the mold cavity by the heated pressure fluid.

References Cited

UNITED STATES PATENTS

| | | | |
|---|---|---|---|
| 288,033 | 11/1883 | Detrick | 25—32 X |
| 857,581 | 6/1907 | Boyle | 25—128 DX |
| 3,511,734 | 5/1970 | Darrow | 264—314 X |
| 1,480,740 | 1/1924 | Barkschat | 264—curing |
| 1,552,064 | 9/1925 | Lake | 264—314 |
| 2,650,412 | 9/1953 | Dubbs | 264—87 |
| 2,311,358 | 2/1943 | Baily | 264—71 |
| 2,395,216 | 2/1946 | Fitzpatrick | 25—128 D |

ROBERT F. WHITE, Primary Examiner

J. H. SILBAUGH, Assistant Examiner

U.S. Cl. X.R.

264—87, 101, 271, 314, DIG 43